May 5, 1925. 1,536,760
T. BOWLER
VALVE
Filed Feb. 4, 1925
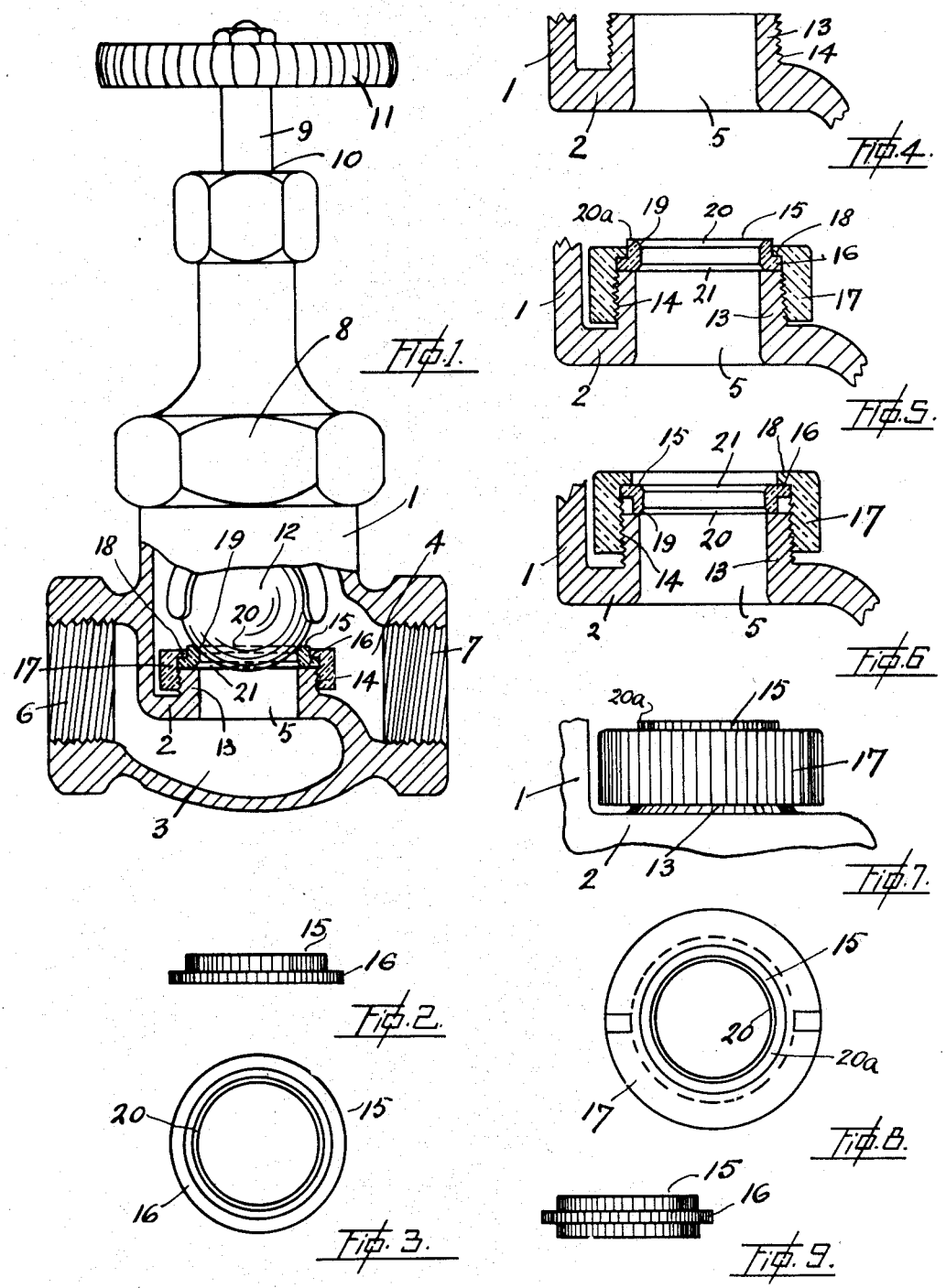
INVENTOR
Thomas Bowler,
By James Taylor
Attorney.

Patented May 5, 1925.

1,536,760

UNITED STATES PATENT OFFICE.

THOMAS BOWLER, OF NORTH VANCOUVER, BRITISH COLUMBIA, CANADA.

VALVE.

Application filed February 4, 1925. Serial No. 6,794.

*To all whom it may concern:*

Be it known that I, THOMAS BOWLER, a subject of the King of Great Britain, and a resident of the city of North Vancouver, in the Province of British Columbia, Canada, have invented certain new and useful Improvements in Valves, of which the following is a specification.

My invention relates to improvements in valves, with more particular reference to valves of the ball or disc type, and the object of my invention is to devise a valve of this character in which provision is made for the equal and consistent expansion and contraction of the valve seat when subjected to heating or cooling as when it is opened or closed to admit steam or shut it off therefrom, thus reducing to a minimum the possibility of distortion of the seat through unequal expansion and contraction of the valve seat and chest and ensuring greater efficiency and longer life of the valve.

I attain this object by the construction illustrated in the accompanying drawings in which Fig. 1 is a view, in part section, of a valve in which my invention is embodied.

Fig. 2 is a detail view, in side elevation, of the valve seat ring.

Fig. 3 is a plan view of Fig. 2.

Fig. 4 is a fragmentary sectional view of the valve chest partition.

Fig. 5 is a fragmentary sectional view of the invention assembled the mitered seat being upmost.

Fig. 6 is a view similar to Fig. 5 the valve seat ring being reversed.

Fig. 7 is an outside view of Fig. 5.

Fig. 8 is a plan view of Fig. 7.

Fig. 9 shows an alternative construction of the ring.

Similar figures of reference indicate similar parts throughout the several views.

1 indicates a valve chest, which, for the purpose of illustration, is shown as of the globe ball valve type, altho the invention may be embodied in any other analogous construction, having the usual partition 2 dividing the valve chamber into the inlet and outlet chambers 3 and 4 communicating with each other through the opening 5, which chambers are provided with the usual threaded orifices 6 and 7 respectively to which inlet and outlet pipes (not shown) may be connected. 8 indicates a cover which is detachably secured to the valve chest body and is provided with the spindle 9 which passes through the stuffing box 10 and is fitted on its outer end with an operating handle or wheel 11, while its lower end carries the ball valve 12, as indicated in Fig. 1. Up to this point the construction described is similar to that of such valves in present use.

According to the present invention, the partition 2 is provided on its upper face with an upstanding portion 13 forming an integral ring concentric with the opening 5, which ring is spaced throughout its circumference clear of any part of the valve chest body and is threaded exteriorly as at 14. Seated on the upper end of the ring 13 is a valve seat ring 15 the bore of which is of the same diameter as that of the ring 13 and opening 5, while intermediate its height it is reduced exteriorly in diameter so that a flange 16 is provided the thickness of which is about half the height of the ring 15 while its outside diameter is not greater than the outside diameter of the ring 13, and the ring 15 is removably held in place by an interiorly threaded collar 17 adapted to screw on to the thread 14 of the portion 13 and flanged inwardly, as at 18, to bear on the ring 15, either on the back of its flange 16 or on the outer face of the flange, as the case may be, and shown more particularly in Figs. 5 and 6. The end of the bore of the ring 15 opposite to the flanged end is mitred as at 19 to form a valve seat 20 co-operating with the ball valve 12, as indicated in Figs. 1 and 5, while the outer end edge is formed perfectly smooth so that it may form a seat 20ª for a disc valve, since the end projects through the collar, as shown in Figs. 5 and 7, should it be desired to substitute a disc valve for the ball valve shown.

The opposite end of the bore of the ring 15 is also mitred to form a valve seat 21 also adapted to co-operate with the ball valve, when the ring is turned upside down, as shown in Fig. 6, and thus provide a fresh seat for the valve in the event of the seat 20 becoming worn or damaged.

An alternative construction of the valve seat ring 15 is shown in Fig. 9, in which the flange 16 is intermediate the height of the ring, the opposite ends of which are formed in duplicate as already described, that is, there is a mitred seat and a disc seat at each end. With this construction either end of the ring projects above the collar 17, when in the normal or reversed position, so that both ball or disc valves may be used with either end respectively.

From the foregoing it will be seen that the ring 15, being free from union as to its wall periphery with any part of the valve chest body, is capable of expanding and contracting independently of the body so that it is characterized by a consistent equal expansion and contraction in itself, eliminating the distortion of the valve seat due to unequal expansion between the seat and the chest body where these are integral and thus ensuring greater efficiency and longer life of the valve.

What I claim as my invention is:—

1. The combination with a valve chest having an apertured partition dividing the valve chamber into communicating inlet and outlet chambers, of an upstanding ring integral with the said partition concentric with the partition aperture and free from contact with the surrounding chest body, a valve seat ring seated on the upper end of said upstanding ring, and means for detachably uniting the valve seat ring to the upstanding one.

2. The combination with a valve chest having an apertured partition dividing the valve chamber into communicating inlet and outlet chambers, of an upstanding ring integral with the said partition concentric with the partition aperture and free from contact with the surrounding chest body, a valve seat ring seated on the upper end of said upstanding ring having its opposite end edges formed as mitred and disc valve seats respectively whereby the disc seat may be substituted for the mitred one on reversing the ring, and means for detachably uniting the valve seat ring to the upstanding one with either the mitred seat or the disc seat upmost.

3. The combination with a valve chest having an apertured partition dividing the valve chamber into communicating inlet and outlet chambers, of an upstanding ring integral with the said partition and concentric with the aperture thereof, said ring being free from contact with the surrounding chest body and exteriorly threaded, a valve seat ring seated on the upper end of said upstanding ring, and a collar threaded on to the upstanding ring securing the said valve seat ring thereto.

4. The combination with a valve chest having an apertured partition dividing the valve chamber into communicating inlet and outlet chambers, of an upstanding ring integral with the said partition and concentric with the aperture thereof, said ring being free from contact with the surrounding chest body and exteriorly threaded, a valve seat ring seated on the upper end of said upstanding ring having one end edge formed as a mitred valve seat and reduced exteriorly in diameter intermediate its height to provide a flange at its opposite end the outer face of which forms a disc valve seat adapted to be substituted for the mitred one on reversing the ring, and a collar threaded on to the upstanding ring flanged inwardly at its outer end to bear respectively on the back of said flange or its outer face and detachably unite the valve seat ring to the upstanding one with either the mitred seat or the disc seat uppermost respectively.

Dated at Vancouver, B. C. this 30th day of January, 1925.

THOMAS BOWLER.